US010496691B1

(12) United States Patent
Chen et al.

(10) Patent No.: US 10,496,691 B1
(45) Date of Patent: Dec. 3, 2019

(54) CLUSTERING SEARCH RESULTS

(71) Applicant: GOOGLE INC., Mountain View, CA (US)

(72) Inventors: Jilin Chen, Sunnyvale, CA (US); Peng Dai, Sunnyvale, CA (US); Lichan Hong, Mountain View, CA (US); Tianjiao Zhang, Sunnyvale, CA (US); Huazhong Ning, San Jose, CA (US); Ed Huai-Hsin Chi, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 860 days.

(21) Appl. No.: 14/847,524

(22) Filed: Sep. 8, 2015

(51) Int. Cl.
*G06F 16/35* (2019.01)
(52) U.S. Cl.
CPC ............ *G06F 16/355* (2019.01); *G06F 16/35* (2019.01)
(58) Field of Classification Search
CPC ......... G06F 17/30864; G06F 17/30867; G06F 17/30991; G06F 16/35; G06F 16/355
USPC ....... 707/722, 740, 737; 382/170; 424/130.1
See application file for complete search history.

(56) References Cited

U.S. PATENT DOCUMENTS

| | | | |
|---|---|---|---|
| 6,701,362 B1 | 3/2004 | Subramonian et al. | |
| 7,542,969 B1 | 6/2009 | Rappaport et al. | |
| 7,555,477 B2 | 6/2009 | Bayley et al. | |
| 8,037,071 B2 | 10/2011 | Venkataraman et al. | |
| 8,122,016 B1 | 2/2012 | Lamba et al. | |
| 8,676,815 B2 | 3/2014 | Deng et al. | |
| 9,501,559 B2 * | 11/2016 | Misra ................ | G06F 17/30672 |
| 2003/0020749 A1 | 1/2003 | Anu-Hakima et al. | |
| 2005/0144162 A1 | 6/2005 | Liang | |
| 2006/0004607 A1 | 1/2006 | Marshall et al. | |
| 2006/0106793 A1 | 5/2006 | Liang | |
| 2006/0206476 A1 | 9/2006 | Kapur et al. | |
| 2007/0038608 A1 | 2/2007 | Chen | |

(Continued)

OTHER PUBLICATIONS

Cimiano, et al., "Learning Concept Hierarchies from Text with a Guided Hierarchical Clustering Algorithm", Proceedings of the ICML 2005 Workshop on Learning and Extending Lexical Ontologies by Using Machine Learning Methods, 2005, 10 pages.

(Continued)

*Primary Examiner* — William Spieler
(74) *Attorney, Agent, or Firm* — Brake Hughes Bellermann LLP

(57) ABSTRACT

Implementations provide an improved system for presenting search results based on entity associations of the search items. An example method includes generating first-level clusters of items responsive to a query, each cluster representing an entity in a knowledge base and including items mapped to the entity, merging the first-level clusters based on entity ontology relationships, applying hierarchical clustering to the merged clusters, producing final clusters, and initiating display of the items according to the final clusters. Another example method includes generating first-level clusters from items responsive to a query, each cluster representing an entity in a knowledge base and including items mapped to the entity, producing final clusters by merging the first-level clusters based on an entity ontology and an embedding space that is generated from an embedding model that uses the mapping, and initiating display of the items responsive to the query according to the final clusters.

20 Claims, 7 Drawing Sheets

(56) References Cited

U.S. PATENT DOCUMENTS

| | | | |
|---|---|---|---|
| 2007/0156665 A1* | 7/2007 | Wnek | G06F 17/3071 |
| 2007/0174320 A1 | 7/2007 | Chou | |
| 2007/0217676 A1* | 9/2007 | Grauman | G06K 9/4671 |
| | | | 382/170 |
| 2007/0260597 A1 | 11/2007 | Cramer | |
| 2008/0065603 A1 | 3/2008 | Carlson et al. | |
| 2008/0071771 A1 | 3/2008 | Venkataraman et al. | |
| 2008/0104061 A1 | 5/2008 | Rezaei | |
| 2008/0133483 A1 | 6/2008 | Bayley et al. | |
| 2008/0133505 A1 | 6/2008 | Bayley et al. | |
| 2008/0168052 A1 | 7/2008 | Ott et al. | |
| 2008/0294628 A1 | 11/2008 | Shoval et al. | |
| 2009/0006974 A1 | 1/2009 | Harinarayan et al. | |
| 2009/0094020 A1 | 4/2009 | Marvit et al. | |
| 2009/0119278 A1 | 5/2009 | Cross et al. | |
| 2010/0049770 A1* | 2/2010 | Ismalon | G06F 17/30646 |
| | | | 707/765 |
| 2010/0191541 A1* | 7/2010 | Prokoski | A61B 5/0064 |
| | | | 705/2 |
| 2012/0203584 A1* | 8/2012 | Mishor | G06Q 30/02 |
| | | | 705/7.11 |
| 2013/0021346 A1* | 1/2013 | Terman | G09B 5/08 |
| | | | 345/467 |
| 2013/0317754 A1* | 11/2013 | Chou | G06F 19/26 |
| | | | 702/19 |
| 2014/0258304 A1* | 9/2014 | Sabanski | G06F 17/30994 |
| | | | 707/740 |
| 2015/0248476 A1* | 9/2015 | Weissinger | G06F 17/30516 |
| | | | 707/737 |
| 2015/0354012 A1* | 12/2015 | Joy | C12Q 1/6886 |
| | | | 424/130.1 |
| 2016/0012020 A1* | 1/2016 | George | G06F 17/2785 |
| | | | 704/9 |
| 2017/0046427 A1* | 2/2017 | Tang | G06F 17/30731 |
| 2017/0073761 A1* | 3/2017 | Harkin | C12Q 1/6886 |

OTHER PUBLICATIONS

Matsuo, et al., "Graph-based Word Clustering using a Web Search Engine", EMNLP '06 Proceedings of the 2006 Conference on Empirical Methods in Natural Language Processing, Jul. 2006, pp. 542-550.

* cited by examiner

CLUSTERING SEARCH RESULTS

BACKGROUND

Search engines conventionally provide search results in the form of a ranked list. Some search engines, such as a search engine for mobile applications, provide popular search results near the top of the ranked list. But popular generic searches, such as "games" or "tools" in a mobile application search engine, cover a large space and the conventional ranked lists provide no logical structure within the results, which allows a few popular applications to dominate the list, making the results insufficiently diverse for some users.

SUMMARY

Implementations provide an improved system for clustering search results. The system uses entities in a knowledge base to form clusters of similar responsive search items. The entities may be classified in an entity ontology, so that parent-child and synonym relationships are known between entities. The search items can be mapped to one or more of the entities. Search items that are responsive to a query can first be clustered by entity, so that a cluster is all the responsive search items that are associated with one particular entity. Then the system may merge clusters based on entity ontology, i.e., where the entities are synonyms for each other, are a parent-child, or are siblings. Some implementations may evaluate cluster results using coverage, balance, overlap, and/or a silhouette ratio. Some implementations may use coverage, balance, overlap, and/or a silhouette ratio to evaluate clusters generated without using entity ontology. Each cluster result may be evaluated based on a regression of one or more of the metrics. Some implementations may employ several clustering methods in parallel to determine potential clusters and select the method that produces the highest scoring clusters. One of the clustering methods that some implementations may use is two-step clustering. In two-step clustering the system first generates one cluster per entity and then merges clusters based on ontology (e.g., synonym, parent-child, or sibling relationships). Clusters for merging may be selected in one of two ways. The first way is to merge two ontologically related entity clusters with the highest similarity score, e.g., a cosine similarity based on an embedding space learned from the search-item to entity mappings. A second way is to merge smaller ontologically related entity clusters together first. Once the best clusters are found in the first stage, in the second stage the system may apply a classical hierarchical clustering (e.g., a greedy algorithm) to further combine clusters. In some implementations the hierarchical clustering may use an embedding similarity to further merge the clusters.

According to one aspect, a method includes determining items responsive to a query, generating first-level clusters of items, each cluster representing an entity in a knowledge base and including items mapped to the entity, merging the first-level clusters based on entity ontology relationships, and applying hierarchical clustering to the merged clusters, producing final clusters. The method also includes initiating display of the items responsive to the query according to the final clusters.

According to one aspect, a method of scoring a cluster includes generating first clusters from items responsive to a query each cluster representing an entity in a knowledge base and including items mapped to the entity, calculating a respective coverage score for each first cluster, calculating a respective balance score for each first cluster, calculating a respective overlap score for each first cluster, calculating a respective silhouette score for each first cluster, calculating a silhouette ratio that applies to all first clusters, and calculating, for each first cluster, a respective cluster score as a regression of the respective coverage score, the respective balance score, the respective overlap score, the respective silhouette score, and the silhouette ratio.

According to one aspect, a method includes determining items responsive to a query, generating first-level clusters from the items, each cluster representing an entity in a knowledge base and including items mapped to the entity, producing final clusters by merging the first-level clusters based on an entity ontology and an embedding space, the embedding spacing being generated from an embedding model that uses the mapping, and initiating display of the items responsive to the query according to the final clusters.

In another aspect, a computer program product embodied on a computer-readable storage device includes instructions that, when executed by at least one processor formed in a substrate, cause a computing device to perform any of the disclosed methods, operations, or processes disclosed herein One or more of the implementations of the subject matter described herein can be implemented so as to realize one or more of the following advantages. As one example, the system provides a similarity metric, evaluation criteria, and a clustering method uniquely suited for searching applications in a web store, although searching in other domains can also benefit from this disclosure. The disclosed implementations provide coherent clusters of search results, providing logical structure within the results, enabling the query requestor to easily explore the search items responsive to the query, and ensuring variety is apparent to the requestor. As another example, implementations easily scale to large search systems because the assignment to categories does not rely on manual assignment or clustering. As another example, some implementations provide a flexible, optimization-based framework running multiple ontology-based clustering algorithms to provide an optimal output.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
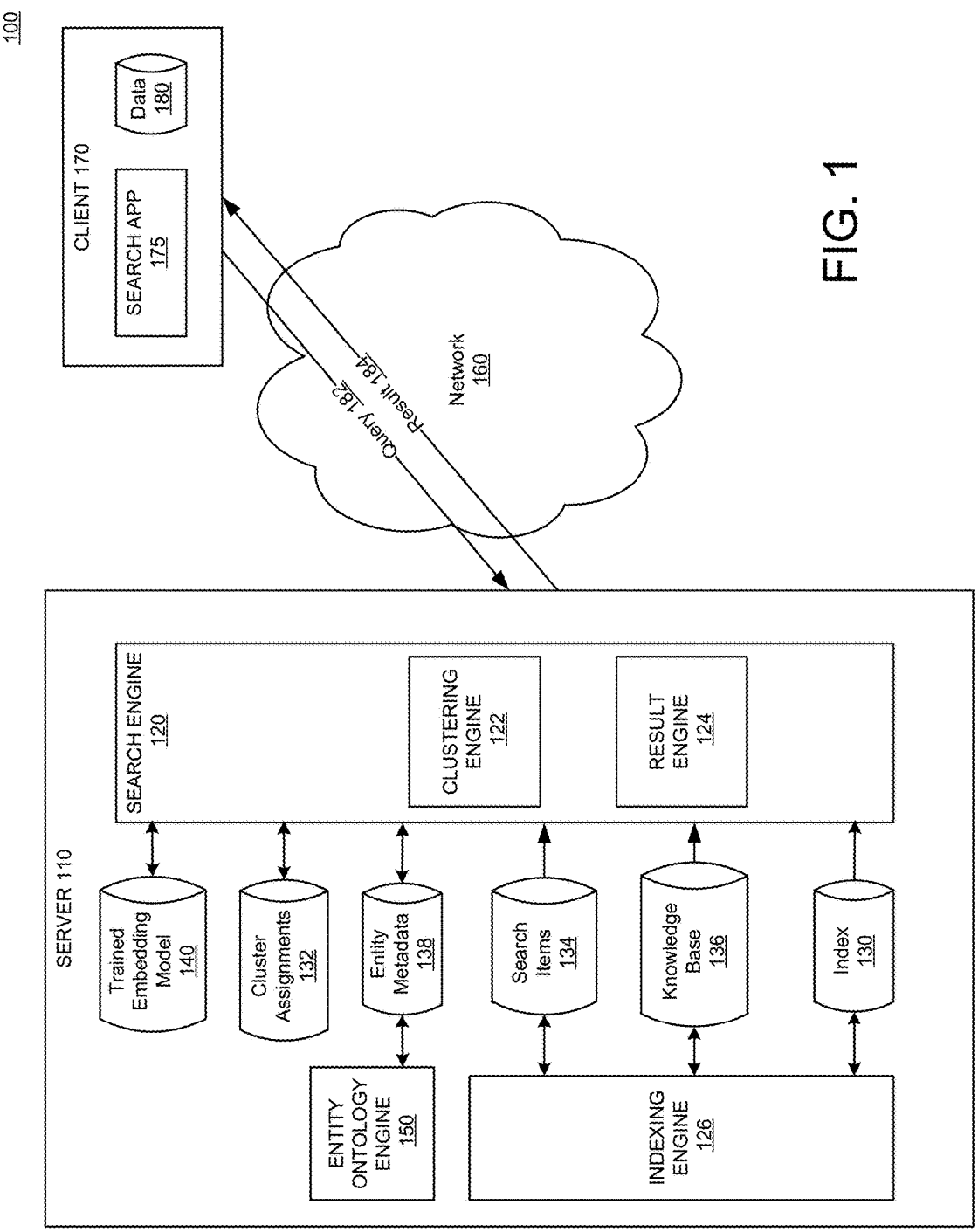
FIG. 1 illustrates an example system in accordance with the disclosed subject matter.

FIG. 1 is a block diagram of a search result clustering system in accordance with an example implementation. The system 100 may be used to generate an entity ontology and use the entity ontology to cluster search results prior to presentation to the user. The depiction of system 100 in FIG. 1 is described as a system for searching for applications, e.g., search items, in a web store. However, other configurations and applications may be used. For example, the search items need not be software applications. For example, the search items may be any products sold in a marketplace or documents available over a network, songs in an online music store, images in a gallery, etc. As another example, implementations need not include every element or functionality described with regard to system 100. For example, some systems may not use parallel evaluation of various clustering methods but may select one. As another example, some implementations may not use the particular cluster evaluation metrics discussed.

Figure 6:
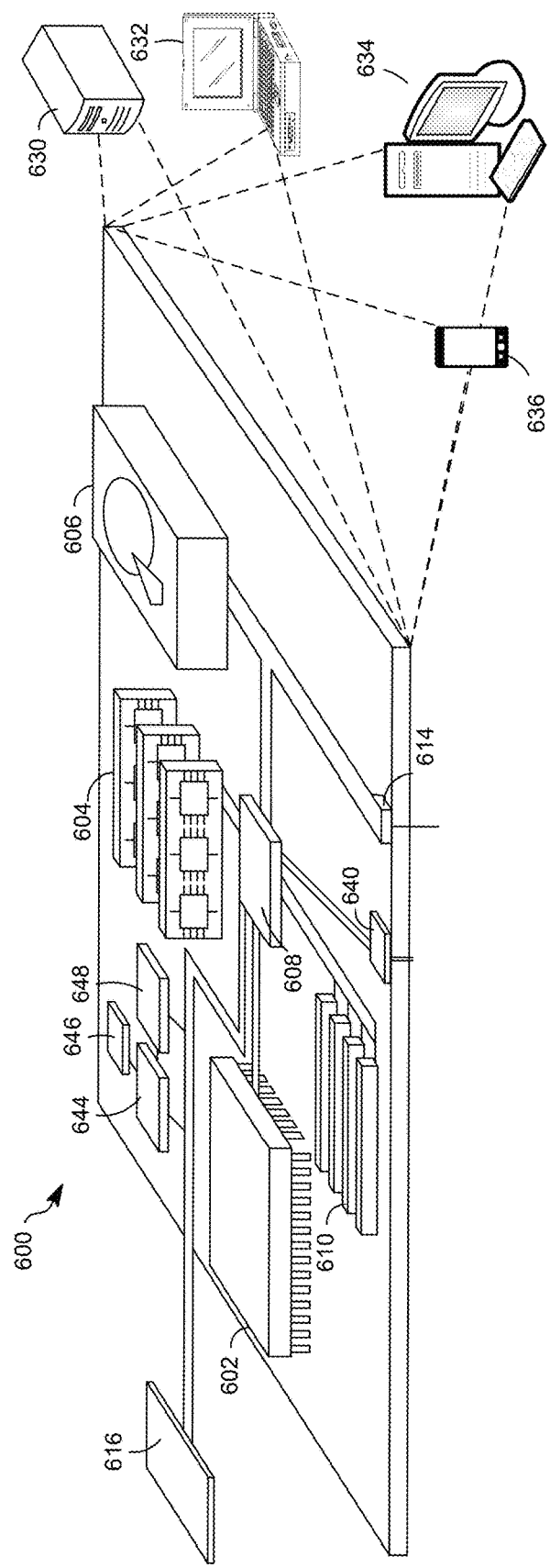
FIG. 6 shows an example of a computer device that can be used to implement the described techniques.
Figure 7:
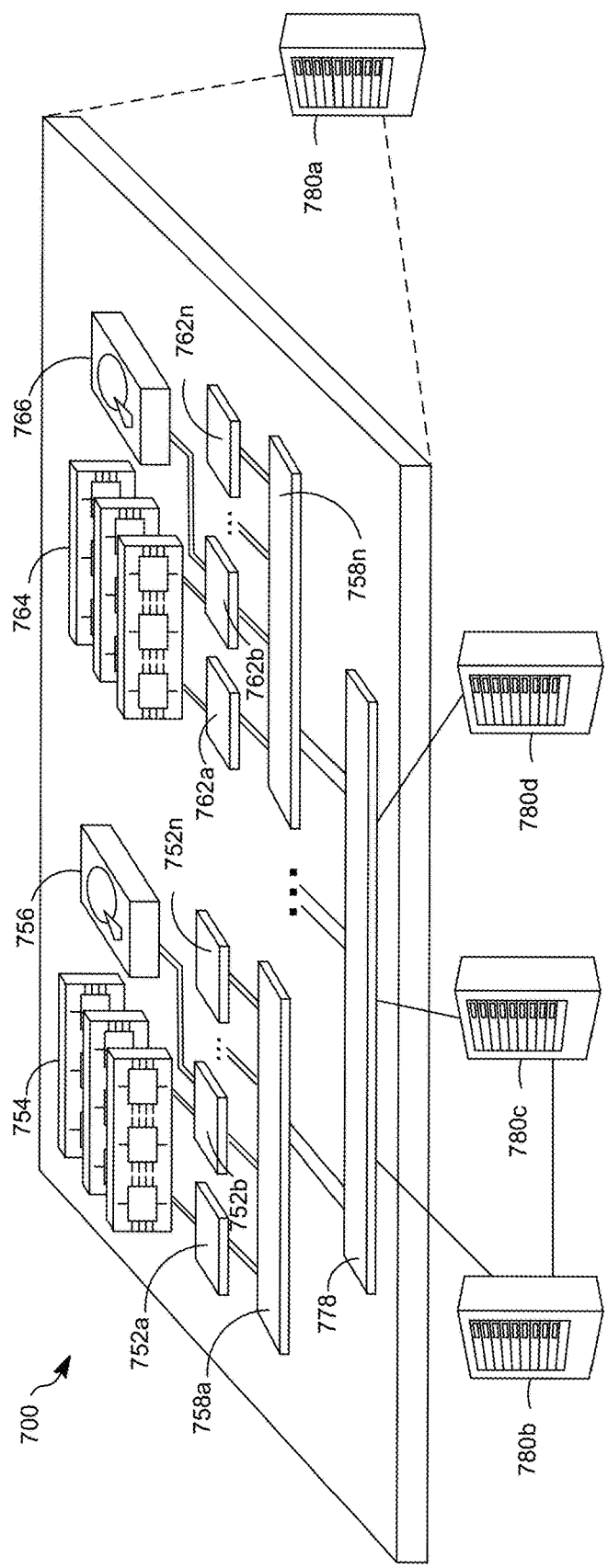
FIG. 7 shows an example of a distributed computer device that can be used to implement the described techniques.

The search result clustering system 100 may be a computing device or devices that take the form of a number of different devices, for example a standard server, a group of such servers, or a rack server system, such as server 110. In addition, system 100 may be implemented in a personal computer, for example a laptop computer. The server 110 may be an example of computer device 600, as depicted in FIG. 6 or computer device 700, as depicted in FIG. 7.

Although not shown in FIG. 1, the server 110 can include one or more processors formed in a substrate configured to execute one or more machine executable instructions or pieces of software, firmware, or a combination thereof. The processors can be semiconductor-based—that is, the processors can include semiconductor material that can perform digital logic. The server 110 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of server 110.

The modules may include an indexing engine 126, a search engine 120, and optionally an entity ontology engine 150. The indexing engine 126 may maintain an index 130 of search items 134 for use by the system 100. The search items 134 may be any items in a collection. For example, search items 134 may be documents available over the Internet, documents available on an Intranet, mobile applications, web applications, or plugins via a web store, songs in an online music store, items for sale via an online marketplace, etc. The indexing engine 126 may process the search items 134 and update index entries in the index 130, for example, using conventional or other indexing techniques.

In some implementations, the indexing engine 126 may use the knowledge base 136 to associate search items 134 with entities in the knowledge base. For example, the search items 134 may include an annotation, description, or other text associated with a search item, or the item may itself include text (e.g., when the item is a document). The indexing engine 126 (or another module not shown) may identify an entity mentioned in the annotation, description, or other text associated with the search item, and may map the search item to that entity. The mapping may be stored in the index 130, in entity metadata 138, or as cluster assignments 132, for example. Each search item in search items 134 may map to one or more entities in the knowledge base 136. In some implementations, only a predefined number of entities are mapped to a search item, e.g., only 5 entities at most are mapped to a search item. In some implementations, the mapping may be based on a relevance score, for example, indicating the relevance of the entity to the search item and only the most relevant entities (e.g., those with a relevance score meeting a threshold) are mapped to the search item. In some implementations, the server 110 may include other modules or processes (not shown) that update and maintain the knowledge base 136.

In some implementations, the indexing engine 126 (or entity ontology engine 150 or another module not shown) may generate an embedding for the search item that maps the search item and entities onto an embedding space. For example, the system 100 may give all entities related to a search item via text a score ranging from 0 to 1, with 1 representing the highest relevance between the search item and the entity. The system may use a machine learning algorithm to generate an embedding for the search item using these scores. The embedding space is represented by trained embedding model 140. In the embedding space, each search item and entity is represented as a point in high-dimension space. The system 100 may use this embedding space (trained embedding model 140) to determine similarity between search items or entities by using the distance between points. The distance refers to how closely related two objects (search items or entities) are.

The search result clustering system 100 may include knowledge base 136. A knowledge base conventionally stores information (facts) about entities. Entities may represent a person, place, item, idea, topic, abstract concept, concrete element, other suitable thing, or any combination of these, and may be represented by a node in the knowledge base. Entities in the knowledge base may be related to each other by edges. The edges may represent relationships between entities, i.e., facts about entities. For example, the data graph may have an entity that corresponds to the actor Humphrey Bogart and the data graph may have an acted in relationship between the Humphrey Bogart entity and entities representing movies that Humphrey Bogart has acted in. In some implementations, the facts may be stored in a tuple, such as <Humphrey Bogart, acted in, Maltese Falcon>. In some implementations the knowledge base 136 may also store some facts about an entity as attributes of the entity. For example the knowledge base 136 may include a birth date for the entity Humphrey Bogart. The attribute may also be considered a labeled relationship for the entity, linking the entity to an attribute value. Thus knowledge about an entity may be represented as labeled relationships between entities and labeled relationships for an entity. A knowledge base with a large number of entities and even a limited number of relationships may have billions of connections. In some implementations, knowledge base 136 may be stored in an external storage device that is accessible from server 110, for example via a network connection. In some implementations, not all entities represented in the knowledge base 136 may relate to the search items 134.

The server 110 may include an entity ontology engine 150. For the purposes of this disclosure, an entity ontology is a set of relationships that link entities as either synonyms or as parent-child. In other words, in an entity ontology, an entity may be related to one or more other entities as a synonym or a hypernym, i.e., as the parent of the other entity, or as a child of the other entity. The entity ontology can be stored as named relationships in the knowledge base 136 (e.g., an edge representing a synonym, ontologic child, or ontologic parent between entities. In some implementations, the entity ontology may be stored in entity metadata 138. In some implementations, the entity ontology, or in other words the synonym and parent/child relationships, may be curated by hand. In some implementations, the system 100 may include entity ontology engine 150 that proposes relationships which may be verified by hand. In some implementations, the verification may take the form of crowdsourcing. For example, the entity ontology engine 150 may be provided with a subset of entities from the knowledge base 136 that are relevant to the search items 134. In a small knowledge base 136, the subset may be all entities, but in a large knowledge base 136 (e.g., millions of entities), the subset may represent entities that are mapped to the search items in search items 134. In some implementations the subset may be the entities mapped most often to search items, e.g., entities mapped to a plurality of search items may be selected over those that map to only one search item.

For the subset of entities, the entity ontology engine 150 may select candidate entity pairs. The entity ontology engine 150 may use a variety of methods to select candidate pairs. The specifics of candidate pair selection is discussed in more detail below with regard to FIG. 5. The candidate pairs may then be presented to a crowdsourcing application. Crowdsourcing applications, such as MECHANICAL TURK and others, enlist the assistance of humans to verify or supply information. In this setting, the system 100 may use a conventional or other crowdsourcing application to verify the relationship between the candidate entities. For example, a crowdsourcing user may be asked to label a candidate pair as a synonym or as a parent/child/sibling, e.g., hypernym relationship, or as unrelated or unknown. Once a relationship has been verified as either a synonym or hypernym, the entity ontology engine 150 may add the candidate pair to the entity ontology, for example in entity metadata 138 or directly in the knowledge base 136. A hypernym relationship exists between a first entity and a second entity when the first entity is either a parent of or a child of the second entity. The first entity is a co-hypernym of the second entity when the first entity and the second entity have the same parent.

The modules may also include search engine 120. The search engine 120 may be configured to use the index 130 to identify search items 134 that are responsive to a query 182 and to provide a search result 184 in response to the query 182. The search engine 120 may include a result engine 124 that may parse the query 182 for keywords and may use the keywords to identify search items from search items 134 that are responsive to the query 182 using index 130 and conventional or later discovered techniques. The search engine 120 may also include a ranking engine that orders the search results. The search engine 120 may also include clustering engine 122. Once responsive search items are discovered, the clustering engine 122 may cluster the responsive search items prior to arrangement of the responsive search items in the search result 184.

Clustering the responsive search items improves the user experience by providing a natural logical structure within the responsive search items in order to maintain and display diversity represented by responsive items. Using entity ontological relationships to cluster the search items improves the clustering by better simulating nuanced search item similarity not captured in conventional hierarchical clustering methods. Thus, the clustering engine 122 may cluster the responsive search items using entity ontological relationships. For example, the clustering engine 122 may form a first-level cluster for each entity represented in the responsive search items. A search item may be mapped to one or more entities, e.g., via entity metadata 138 or as metadata in the search items 134. The clustering engine 122 may use the mapping to generate the first-level clusters. Because a search item may be mapped to more than one entity, the search item may be included in more than one first-level cluster. As indicated earlier, each first-level cluster includes responsive search items mapped to an entity that represents the cluster.

In some implementations, the clustering engine 122 may use an optimization-based framework to select final clusters for use in formatting the search result 184. In an optimization-based framework, the system may use many different clustering methods in parallel to produce different candidate final cluster results and select as the final cluster result the candidate with the best evaluation criteria, e.g., cluster score. One clustering method may include merging clusters based on entity ontology, merging the most similar clusters first, and then applying distance-based clustering to generate the final clusters. Cluster similarity may be based on an embedding similarity, although other conventional similarity measures can be used. For example, using the mapping of search items to entities, the system 100 may train an embedding model 140, e.g., a WALS (weighted average least squares) model, to map search items and entities into an embedding space, as described above. The embedding similarity between two search items can be represented as the cosine similarity within the embedding space. In this particular example, when two entities are ontologically related (i.e., synonyms, hypernyms, or co-hypernyms) the two entities are a candidate pair for further clustering. Candidate pairs may be evaluated for similarity (e.g., using embedding similarity or another similarity measure), and the pairs with the highest similarity are evaluated for merging first.

The clustering engine 122 may perform rounds of clustering (e.g., first level, second level, etc.) and evaluate the clusters after each round. The clustering engine 122 may evaluate potential clusters based on several metrics. Accordingly, the clustering engine 122 may calculate a cluster score for each first-level cluster. If the cluster score for a merged cluster falls below the cluster scores for the component clusters (e.g., the first-level clusters used to form the second-level cluster) the clustering engine 122 determines that the merge is not beneficial and may undo the merge. In other words, if a first cluster and a second cluster are a candidate pair, but the cluster score for the candidate pair is lower than the cluster score for the first cluster or for the second cluster, the clustering engine 122 may discard the cluster pair, e.g., decide not to merge the first cluster and the second cluster. If the cluster score for the candidate cluster is higher, the combination is considered beneficial and the clustering engine 122 may proceed with combining the first cluster and the second cluster. Thus, the clustering engine uses the cluster metrics to generate the highest quality, or best cluster candidates.

In some implementations, the cluster evaluation metrics may be based on a number of factors. The first possible factor is coverage. A coverage score measures the percentage of top-ranked, popular, or relevant search items that the clusters cover. Whether a search item is top-ranked, popular, or relevant depends on the domain of the search item. For example, search items that are applications in a web store may be top-ranked or popular when they are installed after appearing in search results for a search. This is also known as conversion. Similarly, for items in a marketplace or songs available for purchase, the top-ranked or popular items may also be those items actually purchased after a search. A document in a repository (e.g., webpage, image, or video) may be top-ranked or popular when it is selected from a search result presented to the user. An item may also be considered popular based on indicators from social media. Such information may be kept in search records relating to queries submitted to the search engine 120. The search records may keep statistics and metadata about queries and responsive search items submitted to the search engine 120 without storing any personally identifying information, or may anonymize such information, for example by storing a city or zip code for the query information only. A higher percentage of conversion, or in other words the more popular/top-ranked search items the clusters include, the higher the coverage score.

The cluster evaluation metric can also be based on balance. Balance is a measure of how proportional or uniform the clusters are in terms of conversion size, and is calculated as the entropy of the conversion distribution across clusters. A high balance score means the clusters are of equal or similar size. In other words, high balance indicates the most popular/top-ranked search items appear fairly evenly across the clusters. The cluster evaluation metrics can also be based on overlap. An overlap score measures how many duplicate search items are included in different clusters. As indicated above, a search item may be included in more than one first-level cluster (e.g., a cluster for an entity). As the clusters are merged through one or more rounds, the search item may still appear in more than one cluster. A high overlap score, e.g., indicating a high number of search items in more than one cluster, is undesirable.

The cluster evaluation metrics can also be based on silhouette. A silhouette score measures how coherent and separate a cluster is. The clustering engine 122 may thus calculate a silhouette score for each cluster. A silhouette score of a single cluster has two components: first, a self-similarity among the search items within the cluster; and second a similarity between search items from the cluster to the nearest neighbor cluster. Nearest neighbor is understood to be another cluster that is most similar to the cluster, usually determined by a similarity score (e.g., embedding similarity or other similarity score). For a cluster score to be high (e.g., desirable or of high quality), a cluster should be highly self-similar but not similar to its nearest neighbor. In other words, a cluster should be coherent (self-similar) and separate (not very similar to its nearest neighbor).

Finally, the cluster evaluation metrics may also be based on a silhouette ratio. A silhouette ratio score measures the coherence and separation of the overall clustering result. The silhouette ratio score represents the percentage of clusters in the clustering result with a silhouette score above a predefined threshold. The higher the percentage, the better quality the overall clustering result, e.g., the clusters for the current round or level.

The cluster score for a cluster may be a combination of one or more of the five metrics outlined above. In some implementations, the cluster score for a cluster may be a regression of the five metrics. The weight may be implementation-dependent, reflecting how important any one metric is to the overall quality of the clustering result.

The rounds of clustering based on entity ontology merging most similar clusters first may be considered the first stage of a two-stage clustering process. After the first stage, e.g., one or more rounds of clustering based on entity ontology merging the most similar clusters first, the clustering engine 122 may perform a second stage, applying a distance-based clustering, such as hierarchical agglomerative clustering, to generate final clusters. The distance-based clustering may merge the most similar clusters, e.g., based on the embedding space distance. The clustering result of each round of distance-based clustering may be evaluated using the evaluation criteria described above. In some implementations, the system may adjust the similarity score, e.g., the embedding similarity, for cluster pairs that include entities are related in the entity ontology, e.g., are synonyms, hypernyms, or co-hypernyms to favor similarity (e.g., reducing the distance value). This favors merging clusters with related entities and can result in more coherent clusters. The final clusters from this method may represent first final clusters that can be used to present the search items to the requestor.

In addition to the two-stage clustering method described above, the clustering engine 122 may also perform a second two-stage clustering method. The second stage of this two-stage clustering method may be the same as the second stage discussed above, namely using a distance based clustering method to generate final clustering results. The first stage may be similar to the first stage discussed above, in that it is based on the entity ontology. The difference in this second two-stage clustering method is that smaller clusters are merged together first, rather than the most similar clusters. For example, the clustering engine 122 may find clusters that are related based on ontology, such as synonyms, hypernyms, or co-hypernyms, and may merge the smallest clusters together in a round of clustering, evaluating the cluster results after each round based on the metrics above. After merging the smallest ontologically-related clusters together, e.g., after the first stage, the clustering engine 122 may then perform additional rounds of clustering using distance clustering, e.g., hierarchical agglomerative clustering, as described above. The clustering result of each round of distance-based clustering may also be evaluated using the criteria described above. The final clusters from this method may represent second final clusters, and are an alternative to the first final clusters. The clustering engine 122 may select the final clusters that indicate higher quality, e.g., based on the cluster scores.

In some implementations, the clustering engine 122 may also perform other clustering methods in parallel with the two two-stage clustering methods described above. For example, the clustering engine 122 may perform distance-based clustering, but may adjust the cluster score for a cluster when the components of a cluster are related in the entity ontology. For example, the clustering engine 122 may use an embedding similarity to find cluster candidate pairs, and may adjust the similarity score to favor quality (e.g., adjust lower when a lower distance indicates higher similarity) for a cluster candidate when the entities in the pair are related in the entity ontology. The methodology favors cluster results that pair related entities (e.g., synonyms, hypernyms, or co-hypernyms). The final clusters generated using this method may be considered a third final cluster result, and measured against the final cluster results obtained via the two-stage clustering methods. Again, the clustering engine 122 may select the final clusters that indicate highest quality.

In some implementations, as part of optimization-based framework, the clustering engine 122 may perform distance-based clustering to generate fourth final clusters. The distance-based clustering may use embedding similarity, as indicated above, but disregard entity ontological relationships.

The use of several different clustering methods in parallel provides flexibility for clustering engine 122 to determine the best clusters for the particular query, based on the prescribed evaluation metrics. For example, using two-stage clustering may achieve higher coverage for queries that have fragmented results (e.g., results covering many different entities, each only related to a few search items) but may result in incoherent clusters in other queries. Because all clustering methods use the same evaluation criteria, but different clustering parameters, the parallel execution of the different clustering methods can provide the optimal result for a particular query.

Figure 2:
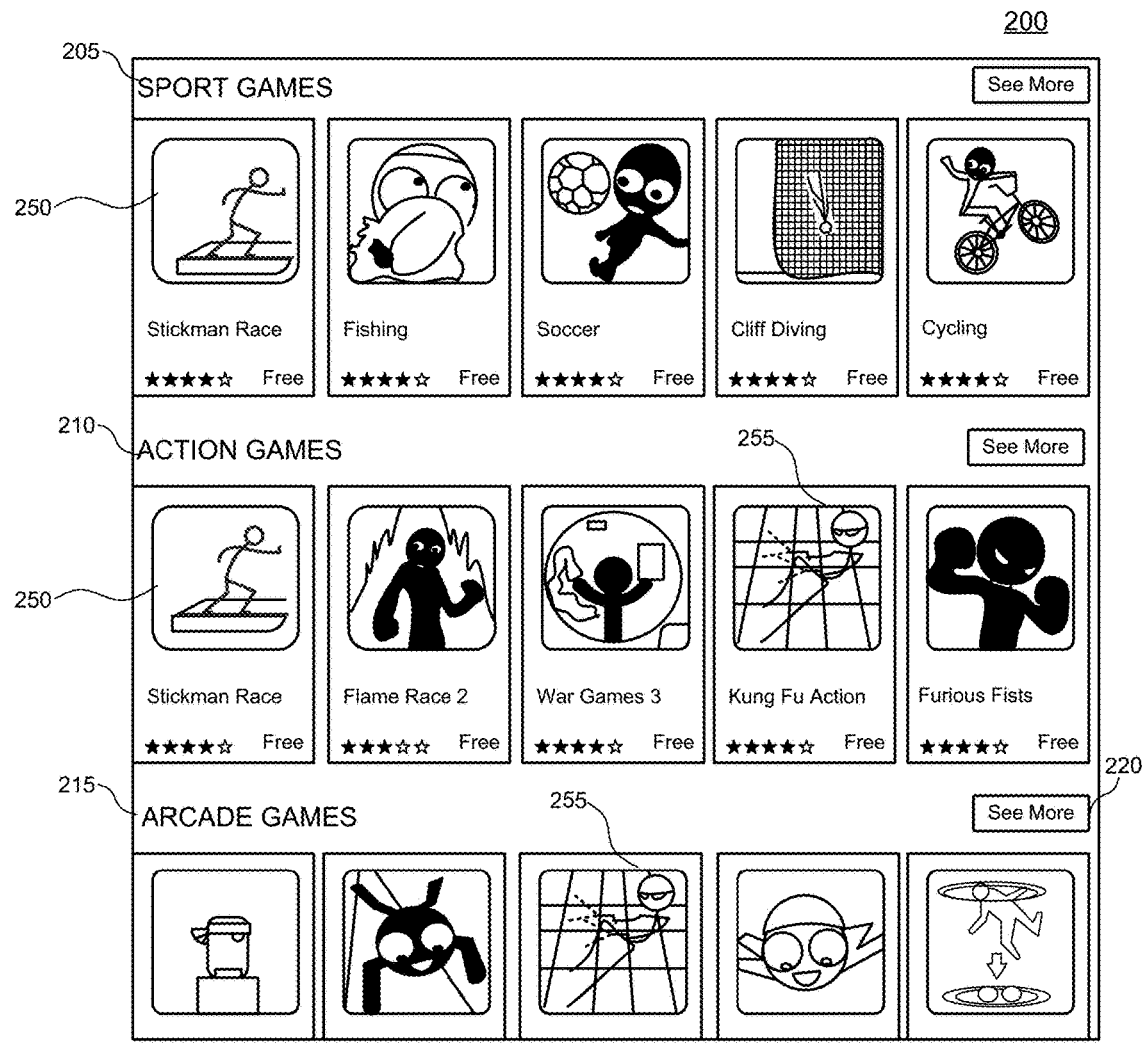
FIG. 2 illustrates an example display of search results clustered using entity ontology, in accordance with disclosed subject matter.

The clustering engine 122 decides on a final set of clusters (e.g., selecting final clusters from the clustering method that produces the highest quality clusters), the result engine 124 may generate information used to display the responsive search items to the query requestor as search results. The result engine 124 may organize responsive search items by cluster. FIG. 2 illustrates an example user interface 200 displaying search items organized by cluster, according to an implementation. In the user interface 200, the search items are mobile applications available from a web store. Example queries that may result in the user interface 200 includes "stickman" or "stickman game." The example user interface 200 includes three final clusters; sport games 205, action games 210, and arcade games 215. As illustrated, clusters may have overlapping search items, such as search item 250, in both the sport games 205 cluster and the action games 210 cluster, as well as search item 255, in the action games 210 cluster and the arcade games 215 cluster. In some implementations, not all search items in a cluster may be presented, instead a representative number of items may be presented and additional items in the cluster can be viewed by selecting a "see more" control 220. Of course other user interface configurations are contemplated and user interface 200 is presented as one example.

Returning to FIG. 1, the system 100 may include a trained embedding model 140. An embedding model is used to represent things, such as search items, in a feature vector, also known as an embedding. A classifier, such as a WALS model, can be provided features for an item and the classifier generates an embedding that represents the item. Other items may be mapped onto the embedding spaces by the trained classifier, or in other words the trained embedding model 140. The trained embedding model 140 may thus map a search item or an entity onto an embedding space using conventional or later discovered techniques. The embedding for a search item may then be used as a measure for similarity with another search item. Likewise, the embedding for an entity mapped to an embedding space may be used as a similarity metric for determining similarity with another entity.

The system 100 may also include cluster assignments 132. The cluster assignments 132 may represent the mapping of search items to one or more entities, as a cluster includes the search items that map to a specific entity that represents the cluster. In some implementations, the system 100 may compute these cluster assignments 132 independently of any queries. In such an implementation, the search engine 120 may determine responsive search items and then use the cluster assignments 132 to determine which clusters those items are mapped to and generate first-level clusters based on the cluster assignments for the responsive search items. In other words, the first level clusters may be an intersection of the cluster assignments 132 and the responsive search items. In other implementations, the cluster assignments 132 may be determined by another mapping, for example as part of metadata in search items 134 or entity metadata 138, at query time.

Search result clustering system 100 may be in communication with client(s) 170 over network 160. Clients 170 may allow a user to provide query 182 to the search engine 120 and to receive search result 184, which organizes responsive search items by cluster assignment. Network 160 may be for example, the Internet or the network 160 can be a wired or wireless local area network (LAN), wide area network (WAN), etc., implemented using, for example, gateway devices, bridges, switches, and/or so forth. Via the network 160, the search result clustering system 100 may communicate with and transmit data to/from clients 170. In some implementations, search result clustering system 100 may be in communication with or include other computing devices that provide updates to the knowledge base 136 and search items 134. Search result clustering system 100 represents one example configuration and other configurations are possible. In addition, components of system 100 may be combined or distributed in a manner differently than illustrated. For example, in some implementations one or more of the search engine 120, the indexing engine 126, the clustering engine 122, the result engine 124, and the entity ontology engine 150, may be combined into a single module or engine. In addition, components or features of the search engine 120, the indexing engine 126, the clustering engine 122, the result engine 124, and the entity ontology engine 150 may be distributed between two or more modules or engines, or even distributed across multiple computing devices.

Figure 3:
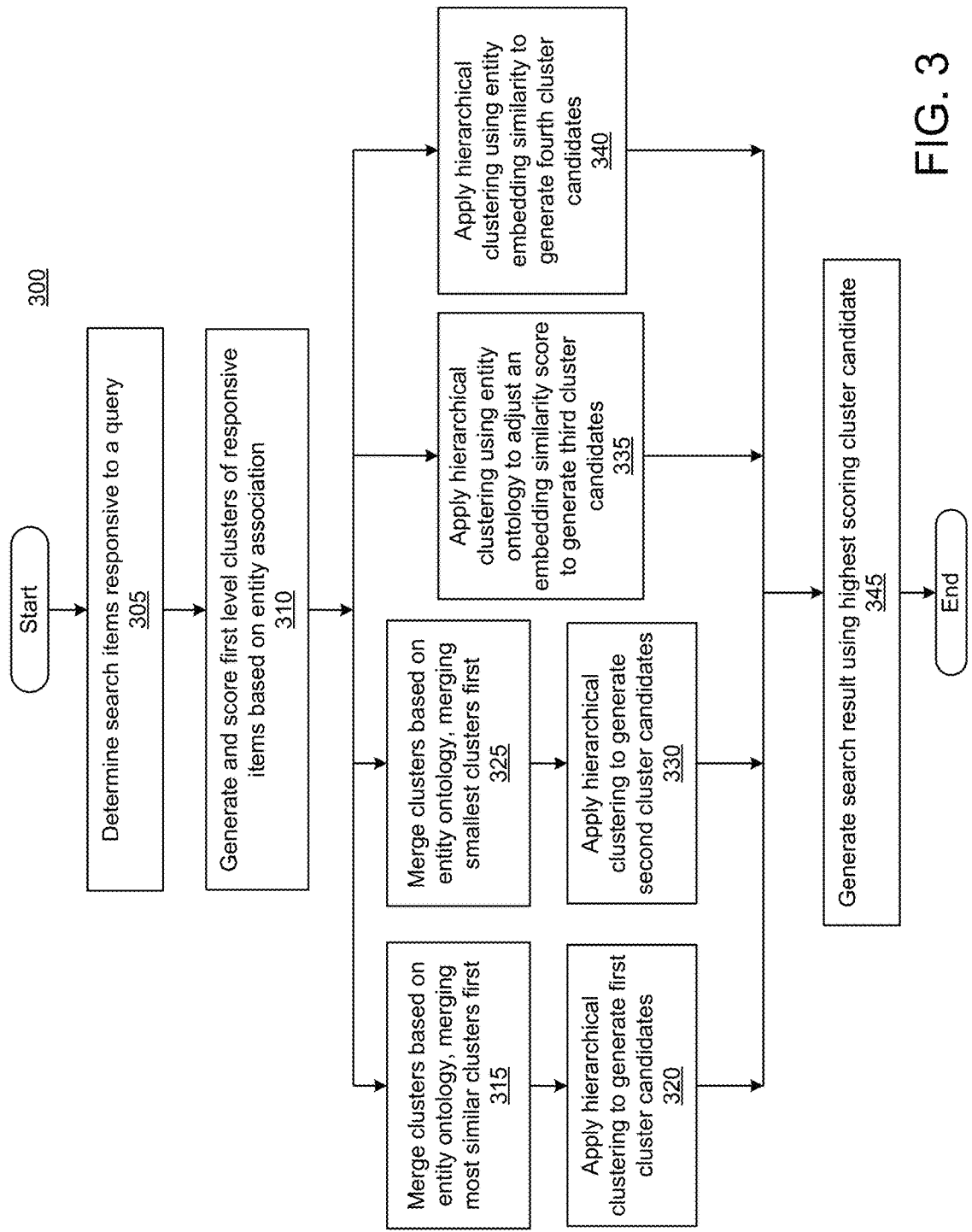
FIG. 3 illustrates a flow diagram of an example process for clustering search results using entity ontology, according to an implementation.

FIG. 3 illustrates a flow diagram of an example process 300 process for clustering search results using entity ontology, according to an implementation. Process 300 may be performed by a search result clustering system, such as system 100 of FIG. 1. Process 300 is an example of an optimization-based clustering framework that performs various clustering methods in parallel, selecting the final clustering result from among the various final result candidates. Process 300 may begin with the search result clustering system determining search items responsive to a query (305). In some implementations, the search items may be applications available in a web store. Responsive items may be items that are associated with keywords or keyword synonyms from the query using conventional or later discovered techniques. The system may then generate and score first level clusters of responsive items based on entity association (310). Each first level cluster may correspond to a single entity, and the responsive search items in the cluster may be mapped to that entity. The mapping may occur based on entities found in or associated with a description of the item or in other text associated with the item. In some implementations, the mappings may be curated by hand. For example, in an implementation where the search items are applications available in a web store, the application developer may provide one or more entities that the application maps to.

The system may also generate a cluster score for a first-level cluster. The cluster score represents a quality measure for the cluster and may be based on a number of factors. The factors that may be used to generate a cluster score are outlined in more detail below with regard to FIG.

4. The cluster score for a particular cluster may be a combination of the factors explained with regard to FIG. 4. In some implementations, the combination may be a regression, with the weights favoring factors that are more important in the particular search domain.

The system may then begin parallel computation of final cluster candidates using various clustering methods. A first clustering method may be a two-stage clustering method that first merges the first-level clusters based on entity ontology, merging most similar clusters first (315). The entity ontology may relate one entity to another as a synonym, as a parent, as a child, or as the child of the same parent. Thus, in this clustering method, only a synonym entity, a parent entity, a child entity, or a sibling entity can be considered for merging, e.g., be a candidate pair. From among the candidate pairs, the system may select a candidate pair that has a highest similarity among the pairs. In some implementations, the cluster similarity may be based on an embedding space, e.g., that maps apps and entities to the embedding space. Similarity may be the cosine similarity within the embedding space. In some implementations, the cluster similarity may be based on similarity of users. For example, web applications may be downloaded and installed by many of the same users, and the more overlap between users the more similar the clusters are. In some implementations, cluster similarity may be based on the number of cluster members that appear together in the top search results for a number of similar queries. Of course, implementations may work with other similarity metrics, and the examples above are exemplary.

Clustering in the first stage may be performed in rounds to determine the best clustering arrangement in a particular round. For example, if clusters A, B, C, D, and E are all synonyms of each other, the system may pair A and C and B and D first based on the similarity metric. The cluster score is then computed for the AC cluster and the BD cluster. Cluster E remains by itself in the second round/level. The cluster scores are then compared to the cluster scores for the individual clusters, namely A, B, C, D, and E. For example, the system may compare the AC cluster score to the cluster score for A and C. If the cluster score of AC is not better than A and C, the system may undo this cluster (and mark it as tried so it does not pair the two clusters again). If the cluster score for B and D is better (e.g., higher), than the cluster scores for B and D alone, the clustering may be kept. The system may continue rounds of pairing existing clusters having an ontological relationship together until intermediate clusters are formed. In some implementations, the first stage may end when pairs of ontologically related clusters no longer meet a minimum degree of similarity. The intermediate clusters represent the best clusters based on ontological relations, favoring similar clusters first.

In a next stage, the system may merge the intermediate clusters using a distance-based clustering methodology, such as hierarchical agglomerate clustering (320). In some implementations, the selection of cluster pairs for hierarchical clustering may be based on an embedding model similarity. In some implementations, intermediate clusters that are most similar, regardless of entity ontology, may be candidate cluster pairs. In some implementations, intermediate clusters that are ontologically related may receive a boost to their similarity score. For example, a distance metric may be decreased (i.e., indicating a higher degree of similarity) when the intermediate clusters being considered as a candidate pair include entities that are synonyms, hypernyms, or co-hypernyms. The clusters formed in the rounds of clustering may be scored as outlined above, with the hierarchical clustering generating final clusters that have optimized cluster scores. In a parallel clustering environment, these clusters may be considered first final cluster candidates.

A second clustering method may be another two-stage clustering method. In this two-stage clustering method, the system first merges the first level clusters based on entity ontology, merging smallest clusters first (325). The entity ontology may relate one entity to another as a synonym, as a parent, as a child, or as the child of the same parent. Thus, in this clustering method, only a synonym entity, a parent entity, a child entity, or a sibling entity can be considered for merging, e.g., be a candidate pair. From among the candidate pairs, the system may select a candidate pair that has a smallest size among the pairs. Clustering in the first stage may be performed in rounds to determine the best clustering arrangement in a particular round. For example, if clusters A, B, C, D, and E are all synonyms of each other, the system may pair A and D together because they each contain the fewest members. The system may pair B and E together because they contain the second fewest pairs. The system may then compute the cluster score for the AD cluster and the BE cluster. Cluster C remains by itself in this second round. The cluster scores are then compared to the cluster scores for the individual member clusters from the previous level, as outlined above, with a merge being undone when the resulting cluster does not result in an increased quality (e.g., a higher cluster score). The system may continue rounds of pairing existing clusters having an ontological relationship and smallest members together until intermediate clusters are formed. The intermediate clusters represent the best clusters based on ontological relations, favoring smallest clusters first.

In a next stage, the system may merge the intermediate clusters using a distance-based clustering methodology, such as hierarchical agglomerate clustering (330). In some implementations, the selection of cluster pairs for hierarchical clustering may be based on an embedding model similarity. In some implementations, intermediate clusters that are most similar, regardless of entity ontology, may be candidate cluster pairs. In some implementations, intermediate clusters that are ontologically related may receive a boost to their similarity score. For example, a distance metric may be decreased when the intermediate clusters being considered as a candidate pair include entities that are synonyms, hypernyms, or co-hypernyms. The clusters formed in the rounds of clustering may be scored as outlined above, with the hierarchical clustering generating final clusters that have optimized cluster scores. In a parallel clustering environment, these clusters may be considered second final cluster candidates.

A third clustering method may be a conventional hierarchical cluster method that adjusts the similarity score based on entity ontology when determining which clusters to merge (335). As outlined above, the hierarchical clustering method may rely on a similarity metric between the clusters and may attempt to merge the most similar clusters first. However, the system may boost the similarity metric to favor higher similarity between two clusters when the two clusters include entities that are ontologically related. In some implementations, the boost may set the similarity metric to a highest similarity value. In some implementations, the boost may represent a percentage increase, such as 50%. Other implementations may use another value to boost the similarity metric. In some implementations, the similarity metric may be a distance based on an embedding space, as discussed above, with a smaller distance representing a higher similarity. The clusters in each round of clustering may be scored using the metrics outlined above. The clusters formed in the rounds of hierarchical clustering may be considered third final cluster candidates.

In another clustering method, the system may apply hierarchical clustering using a similarity metric, but may not use entity ontology in any way (340). Thus, the hierarchical cluster may work as outlined above, but without the boost to the similarity metric. The clusters generated at each round may be evaluated using the evaluation metrics outlined above. Thus, the evaluation metrics used to score the clusters may remain constant across the various clustering algorithms performed in parallel. The clusters generated using this method may be considered fourth final cluster candidates.

Figure 4:
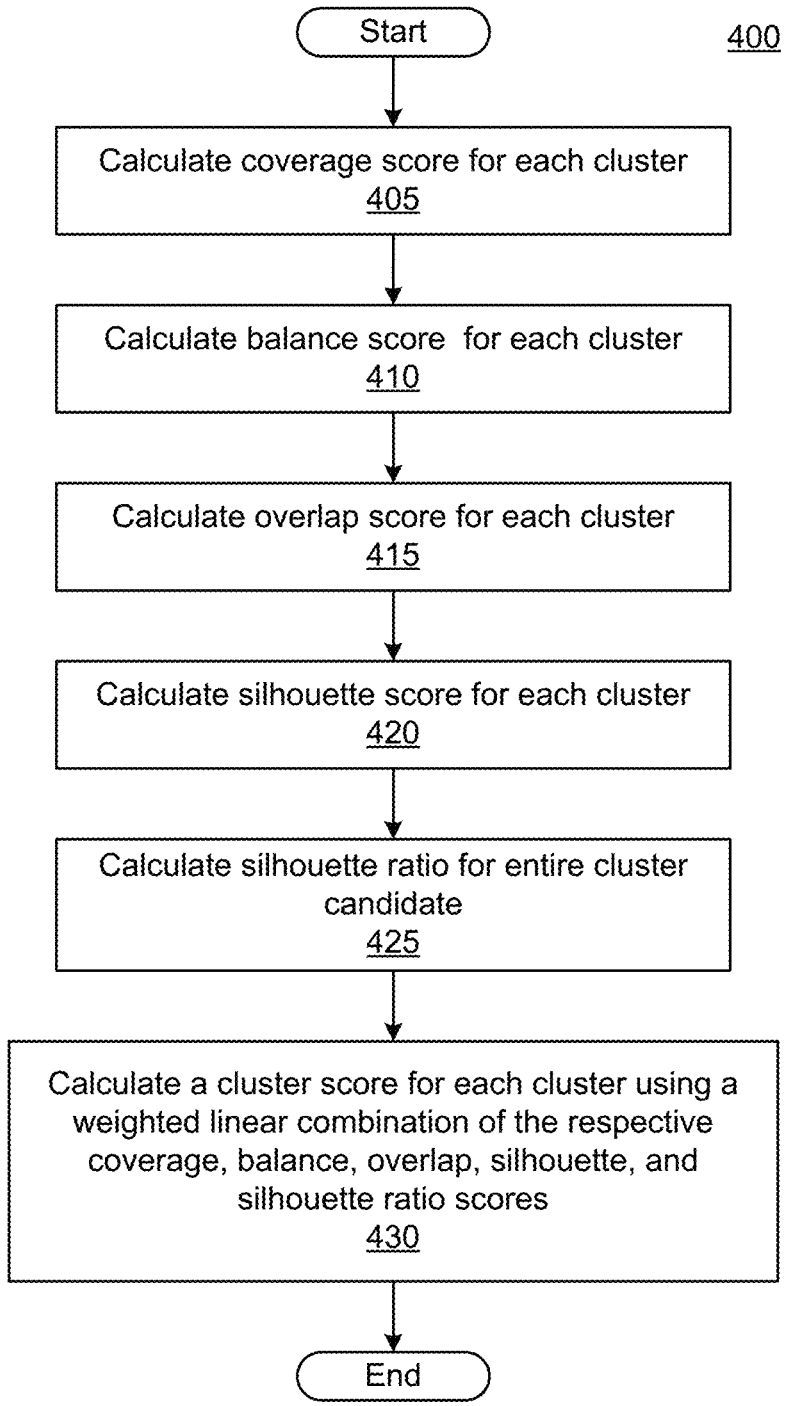
FIG. 4 illustrates a flow diagram of an example process for scoring possible clusters, in accordance with disclosed subject matter.

The system may then select the final cluster results that has the best cluster score, e.g., the score that indicates the highest quality, as the clustering used to generate the search result (345). The highest score may be determined as a combination of the individual cluster scores represented in the final cluster candidates. For example, the score may be an average of the cluster scores, a sum of the cluster scores, etc. Of course, in some implementations, only one of the methods above may be used and step 345 is optional, as the system only generates one final cluster result. In some implementations, the system may use only two or three different clustering methods in parallel, or may use additional clustering methods not described. The system may use the selected final cluster candidate to organize the search result that is presented to the user, as outlined above with regard to FIG. 2. Process 300 then ends, FIG. 4 illustrates a flow diagram of an example process 400 for scoring possible clusters, in accordance with disclosed subject matter. Process 400 may be performed during a clustering process and is not dependent on the clustering process selected. In generating a cluster score, the system may first calculate a coverage score that measures the number of top-rated or popular search items in each cluster (405). In one implementation, top-rated search items may be the items that are ultimately downloaded/purchased after a query. In one implementation, top-rated search items may be the items with a highest relevancy or user-provided ranking. In one implementation, the coverage score may be a percentage of the items in the cluster that are considered top-ranking A higher score thus indicates high coverage (a better indication of quality). The system generates a respective cluster score for each cluster in the cluster result (e.g., a clustering level).

The system may then calculate a balance score for each of the clusters (410). The balance score may be calculated as the entropy of the conversion distribution across clusters. A high balance score may indicate that the coverage score for the cluster being scored does not vary much from the coverage scores of the other clusters. When there is little entropy between clusters, the clusters are balanced, e.g., have well distributed/even distribution of coverage. The system may generate a respective balance score for each cluster in the cluster result (e.g., clustering level).

The system may also calculate an overlap score for each cluster (415). The overlap score is a measure of the duplicate search items in different clusters. While overlap can occur, overlap that is too high is undesirable. The system may calculate an overlap score specific to a cluster, e.g., an indication of the number of items in the cluster that are also found in another cluster. In some implementations, the overlap score may be an inverse of the number of duplicate search items. In other words, no overlapping search items may result in a higher overlap score. Thus, the system may calculate a respective overlap score for each cluster in the cluster result.

The system may also calculate a silhouette score for each cluster (420). The silhouette score measures how coherent and separate a cluster is. A cluster is coherent when the items in the cluster are highly similar. A cluster is separate when the items in the cluster are not that similar with items in the cluster's nearest neighbor. A nearest neighbor is understood to refer to the cluster in the cluster result that is most similar to the cluster being scored. This may be based on the same similarity metric used in the clustering methodology being used. Thus, the silhouette score is a combination of coherency and separateness. The system may calculate a respective silhouette score for each cluster in the cluster result.

The system may also calculate a silhouette ratio score (425). This score may be the same for each cluster in the cluster result (e.g., the clusters at a particular level). The silhouette ratio represents the percentage of clusters in the cluster result that have a silhouette score above a predetermined threshold. The predetermined threshold may be implementation-dependent. In some implementations, the system may use a machine learning algorithm to set the predetermined threshold based on human-curated training examples. In some implementations, the threshold may be set by a user. The silhouette ratio score better approximates human judgment of cluster quality than a simple weighted average of cluster silhouette scores. The system may calculate the silhouette ratio once for each cluster result, but it may be used to calculate an individual cluster's cluster score.

The system may calculate a cluster score for each cluster in the cluster result (430). The cluster score for a particular cluster may be a combination of one or more of the coverage score, the balance score, the overlap score, and the silhouette score for the particular cluster as well as the silhouette ratio for the cluster result. In some implementations, the combination may be a regression. Step 430 is performed for each cluster in the cluster level. The cluster score assists the clustering methods to determine when further clustering is merited. Process 400 then ends.

Figure 5:
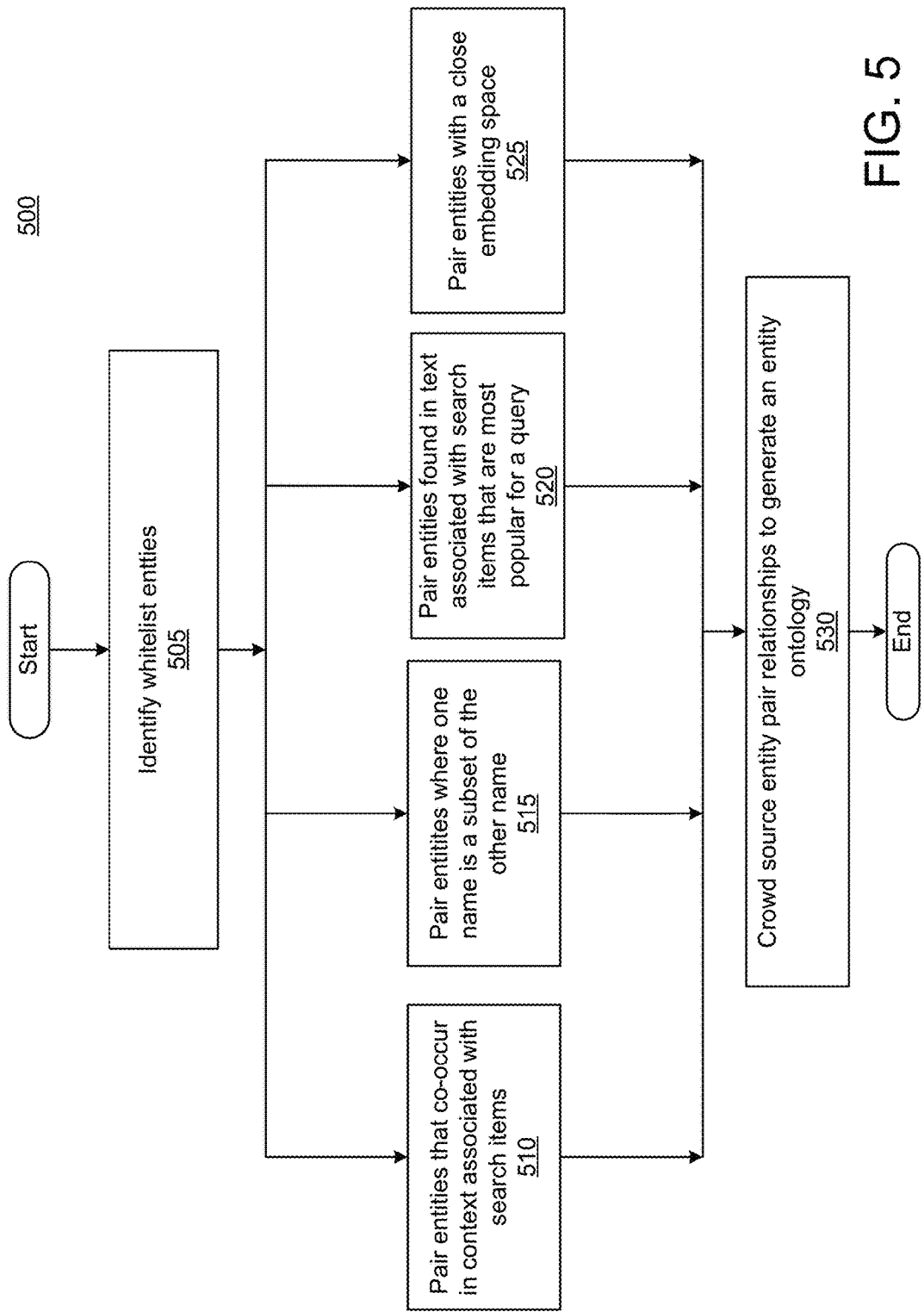
FIG. 5 illustrates a flow diagram of an example process for generating an entity ontology, in accordance with disclosed subject matter.

FIG. 5 illustrates a flow diagram of an example process for generating an entity ontology, in accordance with disclosed subject matter. Process 500 may be performed, for example, by an entity ontology engine in a search result clustering system, such as system 100 of FIG. 1. Process 500 may use a knowledge base to identify entities that may be ontologically related in a domain for search items and propose ontological relationships to be verified via a crowd-sourcing application.

The system may identify whitelist entities from a knowledge base (505). In some implementations, a user may identify the whitelist entities and provide the whitelist entities to the system. In some implementations, all entities in a knowledge base may be identified as whitelist entities. In some implementations, the system may identify whitelist entities as those mapped to the search items. For example, when the search items are applications available from a web store, the search items may map to a subset of entities in the knowledge base. In some implementations, a user may augment this subset of entities. The system may then use various inputs to determine potentially related pairs of entities. For example, pairs of entities that co-occur in the context associated with search items may be related (510). Thus, for example, if a description of an application mentions "game" and "puzzle", both of which are entities in a knowledge base, the system may pair the game and puzzle entities. In some implementations, the system may compute a similarity between the two entities in the pair and only keep the pair if the similarity metric meets a threshold. For example, the similarity metric may be a Jaccard similarity representing the similarity of related entities in the knowledge base. For example, the closer two entities are the more overlap in their related entities in the knowledge base. The Jaccard metric measures the overlap. In some implementations the threshold need not be high. For example, if the similarity is expressed as a number between 0 and 1, with 1 indicating highest similarity, the threshold may be 0.2. If a pair selected based on co-occurrence in the context does not have a similarity score that meets this minimal threshold the system may discard it.

In some implementations, the system may pair entities where one entity name is a subset of another entity name (515). For example, if one entity is National Football League and another entity is just football the system may pair the two entities. In some implementations, the system may guess that the longer named entity is a child of the shorter named entity e.g., the system may guess that National Football League is a child of football.

In some implementations, the system may pair entities found in text associated with top ranked/popular search items for a query (520). For example, the system may track the popularity/ranking data (e.g., conversion data) for the most popular queries within the system. For the search items included in this data, the system may pair the entities found in text associated with one search item with entities found in the text associated with another search item for the same query. For example, an application may have an annotation or description associated with the application. If the annotation of a first application mentions football and the annotation of another application mentions soccer and both applications are top-ranked (e.g., converted) applications for the same query, the system may pair football and soccer.

In some implementations, the system may pair entities with a close embedding space (525). As described above, all entities related to an application via text (e.g., app annotations or descriptions) are given a score ranging from 0 to 1, with 1 representing the highest relationship between the application and the entity. The system may use a machine learning algorithm to generate an embedding for the application. As each application and entity is represented as a point in high-dimension space, the distance between points refers to how closely related to objects (apps or entities) are. Thus, the system may pair entities with a small distance (close distance) in the embedding space.

The system may then use crowdsourcing applications to verify the type of relationship between the pairs, which generates the entity ontology (530). As indicated above, the system may take advantage of existing crowdsourcing applications or may use a proprietary application. The goal of a crowdsourced question may be to classify a pair of entities as synonym, hypernym, unrelated, or "I don't know", which means a relationship likely exists, but may not be one of hypernym or synonym. If at least two crowd source verifications indicate a pair is not related, the pair may be discarded. If at least two crowdsource verifications indicate a relationship of hypernym or synonym, the pair is given the corresponding relationship in the entity ontology. Of course, step 530 may be performed in other manners besides crowdsourcing, especially where there are not as many pairs. Process 500 then ends, having generated an entity ontology that supports the clustering described herein. The system may repeat process 500 occasionally to look for additional entity pairs that may be added to the ontology as search items are added to the system.

FIG. 6 shows an example of a generic computer device 600, which may be system 100, and/or client 170 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be system 100 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

According to one aspect, a method includes determining items responsive to a query, generating first-level clusters of items, each cluster representing an entity in a knowledge base and including items mapped to the entity, merging the first-level clusters based on an entity ontology relationships, and applying hierarchical clustering to the merged clusters, producing final clusters. The method also includes initiating the display of the items responsive to the query according to the final clusters.

These and other aspects can include one or more of the following features. For example, merging the first-level clusters based on the entity ontology relationships can include, for a first first-level cluster, determining a second first-level cluster and a third first-level cluster related to the first first-level cluster in the entity ontology relationships, determining that the first first-level cluster is more similar to the second first-level cluster than the third first-level cluster, and merging the first first-level cluster with the second first-level cluster. As another example, merging the first-level clusters based on the entity ontology can include, for a first first-level cluster, determining a second first-level cluster and a third first-level cluster related to the first first-level cluster based on the entity ontology, determining that the third first-level cluster and the first first-level cluster are smaller than the second first-level cluster, and merging the first first-level cluster with the third first-level cluster. As another example, merging the first-level clusters based on the entity ontology relationships can include calculating a respective cluster score for each first-level cluster, determining second-level cluster candidates, calculating a cluster score for the second-level cluster candidates, and discarding a second-level cluster candidate when the cluster score for the second-level cluster candidate is less than any of the cluster scores for the first-level clusters included in the second-level cluster candidate.

As another example, the method may also include calculating a respective cluster score for each first-level cluster and using the respective cluster scores during the merging. In some implementations, calculating a cluster score for a first first-level cluster include calculating a coverage score for the first first-level cluster, calculating a balance score for the first first-level cluster, calculating an overlap score for the first first-level cluster, and setting the cluster score to a regression of the coverage score, the balance score, and the overlap score. In some implementations, calculating the cluster score for a first-level cluster can further include calculating a silhouette score for each cluster and calculating a silhouette ratio that applies to all clusters, and setting the cluster score to a regression of the coverage score, the balance score, the overlap score, the silhouette score, and the silhouette ratio. As another example, the method may also include pre-computing base clusters prior to receiving the query, wherein a base cluster represents search items associated with one entity based on the mapping and the first-level clusters are subsets of the base clusters.

According to one aspect, a method of scoring a cluster includes generating first clusters from items responsive to a query each cluster representing an entity in a knowledge base and including items mapped to the entity, calculating a respective coverage score for each first cluster, calculating a respective balance score for each first cluster, calculating a respective overlap score for each first cluster, calculating a respective silhouette score for each first cluster, calculating a silhouette ratio that applies to all first clusters, and calculating, for each first cluster, a respective cluster score as a regression of the respective coverage score, the respective balance score, the respective overlap score, the respective silhouette score, and the silhouette ratio.

These and other aspects can include one or more of the following features. For example, the silhouette ratio may be a ratio of a quantity of first clusters with a silhouette score above a threshold divided by a total quantity of first clusters. As another example, the first clusters may each be associated with one of the entities. As another example, the method may also include generating second clusters by applying a clustering methodology to the first clusters and calculating a respective cluster score for each second cluster as a regression of a coverage score, a balance score, an overlap score, a silhouette score, and a silhouette ratio. As another example, an embedding similarity metric is used to calculate the silhouette ratio, the embedding similarity metric being based on the mapping of items to entities.

According to one aspect, a method includes determining items responsive to a query, generating first-level clusters from the items, each cluster representing an entity in a knowledge base and including items mapped to the entity, producing final clusters by merging the first-level clusters based on an entity ontology and an embedding space, the embedding spacing being generated from an embedding model that uses the mapping, and initiating display of the items responsive to the query according to the final clusters.

These and other aspects can include one or more of the following features. For example, producing the final clusters based on an entity ontology and an embedding space can include merging the first-level clusters based on an entity ontology to generate intermediate clusters and applying hierarchical clustering using the embedding space to the intermediate clusters, producing the final clusters. In some implementations, merging the first-level clusters based on the entity ontology can include, for a first first-level cluster, identifying a second first-level cluster and a third first-level cluster related to the first first-level cluster based on the entity ontology, determining that the first first-level cluster is more similar to the second first-level cluster than to the third first-level cluster, and merging the first first-level cluster with the second first-level cluster. In some implementations, merging the first-level clusters based on the entity ontology can include, for a first first-level cluster, identifying a second first-level cluster and a third first-level cluster related to the first first-level cluster based on the entity ontology, determining that the third first-level cluster and the first first-level cluster are each smaller than the second first-level cluster, and merging the first first-level cluster with the third first-level cluster.

As another example, producing final clusters based on an entity ontology and an embedding space can include calculating a distance score between pairs of entities in a candidate cluster pair, adjusting the distance score for the candidate cluster pair to favor higher similarity when the pair includes entities related in the ontology, and merging the first first-level clusters based on the adjusted distance score. As another example, the items are mobile applications and the mapping of mobile applications to entities is based on an application annotation service. As another example, producing the final clusters can include calculating a silhouette score for each cluster, calculating a silhouette ratio that applies to all clusters, and calculating a cluster score for each cluster that accounts for the silhouette score and the silhouette ratio.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A method comprising:
   determining items responsive to a query;
   generating first-level clusters of the items, each cluster representing an entity in a knowledge base and including items mapped to the entity;

calculating a respective cluster score for each first-level cluster, wherein the respective cluster score for a first-level cluster is based on a respective silhouette score that measures coherence and separation of the first-level cluster and on a silhouette ratio representing a percentage of all first-level clusters having a respective silhouette score above a threshold;

merging the first-level clusters based on entity ontology relationships and on respective cluster scores calculated for the merged clusters, wherein the respective cluster score of a merged cluster represents a better score than the respective cluster scores for first-level clusters included in the merged cluster;

applying hierarchical clustering to the merged clusters, producing final clusters that maximize respective cluster scores for the hierarchical clustering; and providing the items responsive to the query for display according to the final clusters.

2. The method of claim 1, wherein merging the first-level clusters based on the entity ontology relationships and on the respective cluster scores includes, for a first first-level cluster:

determining a second first-level cluster and a third first-level cluster related to the first first-level cluster in the entity ontology relationships;

determining that the first first-level cluster is more similar to the second first-level cluster than the third first-level cluster;

creating a second-level cluster candidate by merging the first first-level cluster with the second first-level cluster;

calculating a respective cluster score for the second-level cluster candidate; and keeping the second-level cluster candidate when the respective cluster score for the second-level cluster candidate represents a better score than the respective cluster score for the first first-level cluster and represents a better score than the respective cluster score for the second first-level cluster.

3. The method of claim 2, wherein an embedding similarity metric is used to determine that the first first-level cluster is more similar to the second first-level cluster.

4. The method of claim 1, wherein merging the first-level clusters based on the entity ontology and on the respective cluster scores includes, for a first first-level cluster:

determining a second first-level cluster and a third first-level cluster related to the first first-level cluster based on the entity ontology relationships;

determining that the third first-level cluster and the first first-level cluster are smaller than the second first-level cluster;

creating a second-level cluster candidate by merging the first first-level cluster with the third first-level cluster;

calculating a respective cluster score for the second-level cluster candidate; and keeping the second-level cluster candidate when the respective cluster score for the second-level cluster candidate represents a better score than the respective cluster score for the first first-level cluster and represents a better score than the respective cluster score for the second first-level cluster.

5. The method of claim 4, wherein merging the first-level clusters based on the entity ontology relationships includes:

discarding the second-level cluster candidate when the cluster score for the second-level cluster candidate represents a worse score than any of the cluster scores for the first-level clusters included in the second-level cluster candidate.

6. The method of claim 1, wherein calculating a respective cluster score for each first first-level cluster includes:

calculating a coverage score for the first first-level cluster;
calculating a balance score for the first first-level cluster;
calculating an overlap score for the first first-level cluster; and setting the cluster score to a regression of the silhouette score, the silhouette ratio, the coverage score, the balance score, and the overlap score.

7. The method of claim 1, wherein calculating the respective cluster score further includes:

setting the cluster score to a regression of the silhouette score and the silhouette ratio.

8. The method of claim 1, further comprising:

pre-computing base clusters prior to receiving the query, a base cluster representing search items associated with one entity based on the mapping, wherein the first-level clusters are subsets of the base clusters.

9. A method comprising:

generating first clusters from items responsive to a query, each cluster representing an entity in a knowledge base and including items mapped to the entity;

calculating a respective coverage score for each first cluster;

calculating a respective balance score for each first cluster;

calculating a respective overlap score for each first cluster;

calculating a respective silhouette score for each first cluster;

calculating a silhouette ratio that applies to all first clusters, wherein a silhouette ratio is a ratio of a quantity of first clusters with a silhouette score above a threshold divided by a total quantity of first clusters;

calculating, for each first cluster, a respective cluster score as a regression of the respective coverage score, the respective balance score, the respective overlap score, the respective silhouette score, and the silhouette ratio;

generating second clusters by applying a clustering methodology to the first clusters, wherein the clustering methodology selects second clusters where a respective cluster scores for the second cluster, which is also based on a regression of a coverage score, a balance score, an overlap score, a silhouette score, and a silhouette ratio, represents a better score than the respective cluster scores for first clusters included in the second cluster; and providing the items responsive to the query for display according to the second clusters.

10. The method of claim 9, wherein calculating the cluster score includes using a weight to favor at least one of the coverage score, the balance score, the overlap score, the silhouette score, or the silhouette ratio based on a search domain for the items.

11. The method of claim 9, wherein the first clusters are each associated with one of the entities.

12. The method of claim 9, wherein the clustering methodology comprises:

generating intermediate clusters by merging the first clusters based on entity ontology, each intermediate cluster having a better respective cluster score than the respective cluster score of any first-level clusters in the intermediate cluster; and generating the second clusters using a hierarchical clustering.

13. The method of claim 9, wherein an embedding similarity metric is used to calculate the silhouette ratio, the embedding similarity metric being based on a mapping of items to entities.

14. A method comprising:
   determining items responsive to a query;
   generating first-level clusters from the items, each cluster representing an entity in a knowledge base and including items mapped to the entity;
   calculating a respective cluster score for each first-level cluster, wherein the respective cluster score for a first-level cluster is based on a respective silhouette score that measures coherence and separation of the first-level cluster and on a silhouette ratio representing a percentage of all first-level clusters having a respective silhouette score above a threshold;
   producing final clusters by merging the first-level clusters based on an entity ontology and an embedding space, the embedding space being generated from an embedding model that uses the mapping, each final cluster having a respective cluster score that is greater than any of the respective cluster scores for the first-level clusters included in the final cluster, and the respective cluster score of a final cluster also being based on a silhouette score and a silhouette ratio calculated for the final cluster; and
   providing the items responsive to the query for display according to the final clusters.

15. The method of claim 14, wherein producing the final clusters based on an entity ontology and an embedding space includes:
   merging the first-level clusters based on an entity ontology to generate intermediate cluster, wherein a respective cluster score for an intermediate cluster is calculated based a silhouette score and a silhouette ratio for the intermediate cluster; and
   applying hierarchical clustering using the embedding space to the intermediate clusters, producing the final clusters.

16. The method of claim 15, wherein merging the first-level clusters based on the entity ontology includes, for a first first-level cluster:
   identifying a second first-level cluster and a third first-level cluster related to the first first-level cluster based on the entity ontology;
   determining that the first first-level cluster is more similar to the second first-level cluster than to the third first-level cluster; and
   merging the first first-level cluster with the second first-level cluster.

17. The method of claim 15, wherein merging the first-level clusters based on the entity ontology includes, for a first first-level cluster:
   identifying a second first-level cluster and a third first-level cluster related to the first first-level cluster based on the entity ontology;
   determining that the third first-level cluster and the first first-level cluster are each smaller than the second first-level cluster; and
   merging the first first-level cluster with the third first-level cluster.

18. The method of claim 14, wherein producing final clusters based on an entity ontology and an embedding space includes:
   calculating a distance score between pairs of entities in a candidate cluster pair;
   adjusting the distance score for the candidate cluster pair to favor higher similarity when the pair includes entities related in the entity ontology; and
   merging the first first-level clusters based on the adjusted distance score.

19. The method of claim 14, wherein the items are mobile applications and the mapping of mobile applications to entities is based on an application annotation service.

20. The method of claim 14, wherein calculating a respective cluster score includes:
   applying a weight in a regression of the silhouette score and the silhouette ratio to favor at least one of the silhouette score or the silhouette ratio.

* * * * *

UNITED STATES PATENT AND TRADEMARK OFFICE
CERTIFICATE OF CORRECTION

PATENT NO. : 10,496,691 B1
APPLICATION NO. : 14/847524
DATED : December 3, 2019
INVENTOR(S) : Chen et al.

Page 1 of 1

It is certified that error appears in the above-identified patent and that said Letters Patent is hereby corrected as shown below:

In the Claims

In Column 22, Claim 9, Line 44, delete "scores" and insert --score--, therefor.

Signed and Sealed this
Seventeenth Day of March, 2020

Andrei Iancu
*Director of the United States Patent and Trademark Office*